United States Patent
Ouderkirk

(10) Patent No.: US 10,572,731 B1
(45) Date of Patent: Feb. 25, 2020

(54) INFRARED TRANSPARENT BACKLIGHT DEVICE FOR EYE TRACKING APPLICATIONS

(71) Applicant: Facebook Technologies, LLC, Menlo Park, CA (US)

(72) Inventor: Andrew John Ouderkirk, Redmond, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 22 days.

(21) Appl. No.: 15/919,932

(22) Filed: Mar. 13, 2018

(51) Int. Cl.
  *G06K 9/00* (2006.01)
  *H04N 5/225* (2006.01)
  *H04N 5/33* (2006.01)
  *G06F 3/01* (2006.01)

(52) U.S. Cl.
  CPC ....... *G06K 9/00604* (2013.01); *H04N 5/2256* (2013.01); *H04N 5/33* (2013.01); *G06F 3/013* (2013.01)

(58) Field of Classification Search
  CPC .... G06K 9/00604; H04N 5/2256; H04N 5/33; G06F 3/013
  See application file for complete search history.

(56) References Cited

U.S. PATENT DOCUMENTS

| | | | |
|---|---|---|---|
| 2015/0035744 A1* | 2/2015 | Robbins | G02B 27/017 345/156 |
| 2015/0138451 A1* | 5/2015 | Amitai | G02B 27/0093 349/11 |
| 2018/0045927 A1* | 2/2018 | Heeren | G02B 15/24 |
| 2018/0082644 A1* | 3/2018 | Bohn | G02B 6/003 |
| 2018/0157320 A1* | 6/2018 | Trail | G06F 3/011 |
| 2018/0210134 A1* | 7/2018 | Richards | G02B 6/0053 |
| 2019/0229495 A1* | 7/2019 | Pierer | H01S 5/02288 |
| 2019/0293856 A1* | 9/2019 | Danziger | G02B 6/34 |
| 2019/0293941 A1* | 9/2019 | Yeoh | G02B 26/103 |

* cited by examiner

*Primary Examiner* — Joseph Suh
(74) *Attorney, Agent, or Firm* — Fenwick & West LLP

(57) ABSTRACT

A backlight device provides light in a first optical band to a spatial light modulator, and is transmissive to light in a second optical band. The backlight device includes a structured dichroic reflector that is substantially reflective, and scatters light in the first optical band. The structured dichroic reflector is also substantially transparent in the second optical band, and the second optical band is different than the first optical band. The backlight device is configured to receive light in the first optical band from an illumination source. The dichroic reflector is configured to reflect light in the first optical band toward a display panel that converts the light from the backlight device to image light. The backlight device may be part of a head-mounted display.

11 Claims, 5 Drawing Sheets

INFRARED TRANSPARENT BACKLIGHT DEVICE FOR EYE TRACKING APPLICATIONS

BACKGROUND

This disclosure relates generally to eye tracking in head-mounted displays, and specifically relates to using an infrared transparent backlight device for eye tracking applications in a head-mounted displays.

Some conventional display systems use a separate light source in conjunction with a Backlight Unit (BLU). A BLU typically incorporates different light scattering layers that scatter both visible light and infrared (IR) light. The scattering characteristics of the BLU restrict locations of IR cameras and/or IR sources in head-mounted displays. For example, an IR camera positioned to image an object through a BLU would have poor image quality due to the scattering of IR light caused by the BLU.

SUMMARY

A backlight device provides light in a first optical band (e.g., visible) to a spatial light modulator (e.g., an electronic display), and is transmissive to light in a second optical band (e.g., IR). The backlight device includes a structured dichroic reflector that is substantially reflective—and scatters light in the first optical band. The structured dichroic reflector is also substantially transparent in the second optical band that is different than the first optical band. The backlight device is configured to receive light in the first optical band from an illumination source, and the dichroic reflector is configured to reflect (i.e., scatter) light in the first optical band toward a display panel that converts the light from the backlight device to image light. In some embodiments, a camera is configured to image in the second optical band an object through the backlight device. Additionally, in some embodiments, a source that emits light in the second optical band is positioned to emit light through the backlighting device.

In some embodiments, the backlight device includes a structured dichroic reflector that has at least 80% reflectivity for light in the first optical band. And light rays in the first optical band incident on the structured dichroic reflector have at least an average of a 30% deviation in ray angle, and light rays in a second optical band incident on the structured dichroic reflector have at least a 60% transmission. Additionally, an image captured through the backlight device in the second optical band has an optical transfer function of at least a threshold value.

In some embodiments, the structured dichroic reflector is immersed in an optical media. The optical media has a first surface and a second surface that is opposite the first surface and the structured dichroic reflector is positioned between the first surface and the second surface. In some embodiments, the structured dichroic reflector includes an undulating surface that has a maximum angle of no more than a threshold angle relative to the second surface and is configured to reflect light in the first optical band through the second surface toward a display panel.

In some embodiments, a backlight device is part of a head-mounted display (HMD). The backlight device includes a first surface and a second surface that is opposite to the first surface. The backlight device is configured to receive light in a first optical band from an illumination source, and the backlight device includes a structured dichroic reflector that is substantially reflective in the first optical band and is substantially transparent in a second optical band that is different than the first optical band. The structured dichroic reflector is configured to reflect light in first optical band through the second surface toward a display panel that converts the light from the backlight device to image light.

The HMD additionally, includes an optics block and an eye tracking system. The optics block includes one or more optical elements configured to direct the image light to an eyebox (e.g., a region in space that is occupied by an eye of a user of the HMD). The eye tracking system includes one or more light sources, a camera assembly, and a controller. The light source illuminates the eyebox with light in the second optical band. In some embodiments, a light source, of the one or more light sources, emit light in the second optical band. Additionally, in some embodiments, a light source, of the one or more light sources, may be positioned to emit light through the backlight device towards the eyebox. The camera assembly is positioned adjacent to the first surface of the backlight device. The camera assembly is configured to capture images of the eye in the second optical band through the backlight device, the display panel, and the optics block. The controller is configured to determine eye tracking information based at least in part on the captured images.

The figures depict various embodiments of the present disclosure for purposes of illustration only. One skilled in the art will readily recognize from the following discussion that alternative embodiments of the structures and methods illustrated herein may be employed without departing from the principles, or benefits touted, of the disclosure described herein.

DETAILED DESCRIPTION

Configuration Overview

A backlight device is implemented to improve the clarity of generated images of a user's eye. The backlight device is configured with a dichroic reflective film to be reflective (e.g., 80%) to light within a first band of wavelengths and transmissive (e.g., 60%) to light within a second band of wavelengths. Reflected light rays within the first band are redirected to the display panel to be converted to imaging light. In some embodiments, the structured dichroic reflective film is immersed in an optical media on both the first and second sides.

In some embodiments, the backlight device is part of a HMD. In addition to the backlight device, the HMD includes an electronic display panel, an optics block, and a camera assembly. The estimated eye position and/or additional information may be used by the HMD to adjust a location of an image plane at which content is presented to a user, perform foveated rendering, or some other action that is based in part on estimated eye position, or some combination thereof. In some embodiments, the HMD may be part of an artificial reality system.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

Head-Mounted Display Overview

Figure 1:
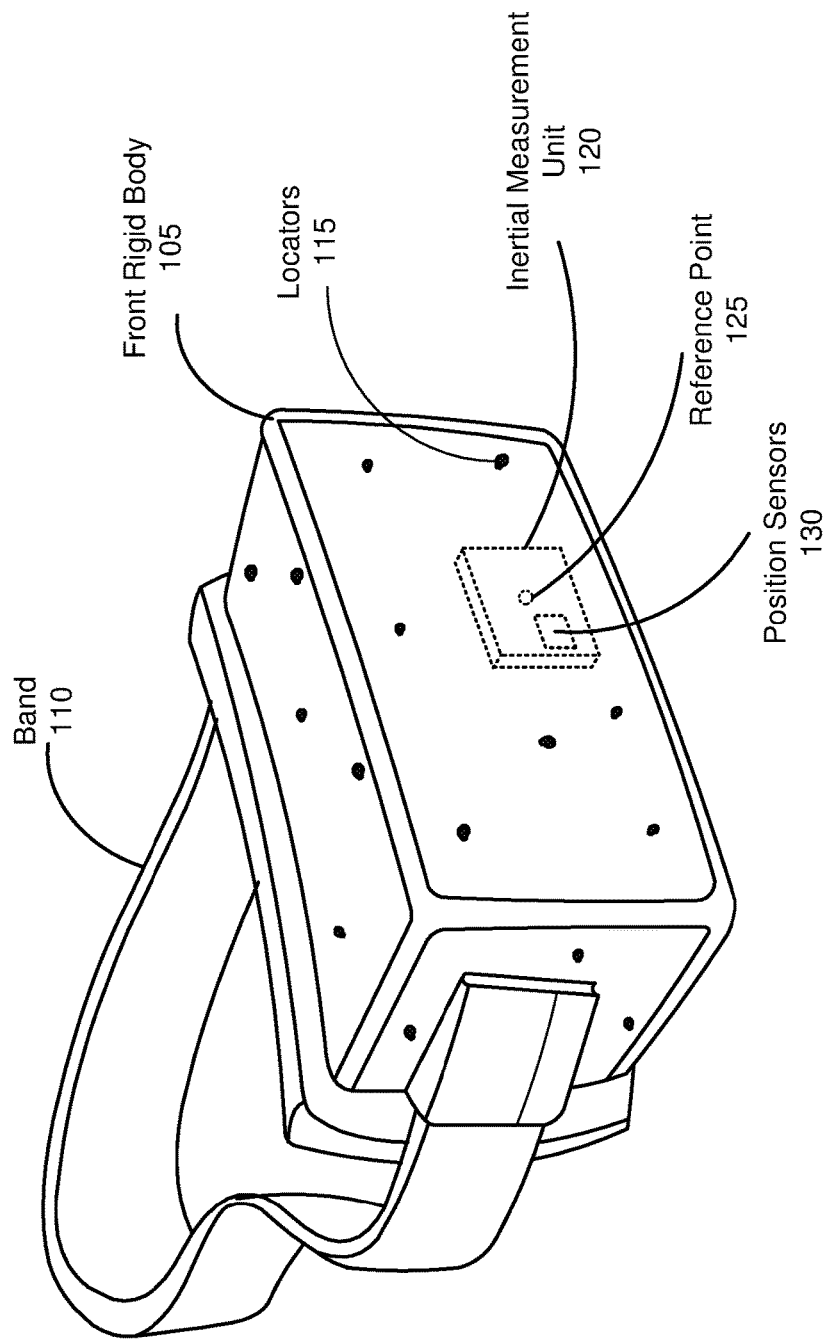
FIG. 1 is a diagram of a head-mounted display (HMD), in accordance with one embodiment.

FIG. 1 is a diagram of a head-mounted display (HMD) 100, in accordance with one embodiment. Externally, the HMD 100 includes a front rigid body 105 and a band 110. Internally, the front rigid body 105 includes a plurality of locators 115, an inertial measurement unit (IMU) 120, a reference point 125, and position sensors 130.

The locators 115 are objects located in specific positions in the HMD 100 relative to one another and a specific reference point on the HMD 100. Each locator 115 may be a light emitting diode (LED), a corner cube reflector, a reflective marker, a type of light source that contrasts with the operating environment of the HMD 100, or some combination thereof. In embodiments where the locators 115 are active (i.e., an LED or other type of light emitting device), the locators 115 may emit light in the visible band (~380 nm to 750 nm), in the IR band (~750 nm to 1700 nm), in the ultraviolet band (200 nm to 380 nm), some other portion of the electromagnetic spectrum, or some combination thereof. In some embodiments, the locators 115 are located beneath an outer surface of the HMD 100, which is transparent to the wavelengths of light emitted or reflected by the locators 115 or is thin enough not to substantially attenuate the wavelengths of light emitted or reflected by the locators 115. Additionally, in some embodiments, the outer surface or other portions of the HMD 100 are opaque in the visible band of wavelengths of light. Thus, the locators 115 may emit light in the IR band under an outer surface that is transparent in the IR band but opaque in the visible band.

The IMU 120 is an electronic device that generates IMU data based on measurement signals received from the position sensors 130. A position sensor 130 generates one or more measurement signals in response to motion of the HMD 100. Examples of position sensors 130 include: one or more accelerometers, one or more gyroscopes, one or more magnetometers, another suitable type of sensor that detects motion, a type of sensor used for error correction of the IMU 120, or some combination thereof. The position sensors 130 may be located external to the IMU 120, internal to the IMU 120, or some combination thereof.

The reference point 125 is a point that may be used to describe the position of the HMD 100. While the reference point 125 may generally be defined as a point in space; however, in practice the reference point 125 is defined as a point within the HMD 100 (e.g., a center of the IMU 120).

Based on the one or more measurement signals from one or more position sensors 130, the IMU 120 generates IMU data indicating an estimated position of the HMD 100 relative to an initial position of the HMD 100. For example, the position sensors 130 include multiple accelerometers to measure translational motion (forward/back, up/down, left/right) and multiple gyroscopes to measure rotational motion (e.g., pitch, yaw, and roll). In some embodiments, the IMU 120 rapidly samples the measurement signals and calculates the estimated position of the HMD 100 from the sampled data. For example, the IMU 120 integrates the measurement signals received from the accelerometers over time to estimate a velocity vector and integrates the velocity vector over time to determine an estimated position of a reference point on the HMD 100.

In some embodiments, the HMD 100 may act as an artificial reality headset, or some combination thereof. In embodiments that describe, e.g., an AR or MR system environment, one or more portions of the HMD 100 may be at least partially transparent.

Figure 2:
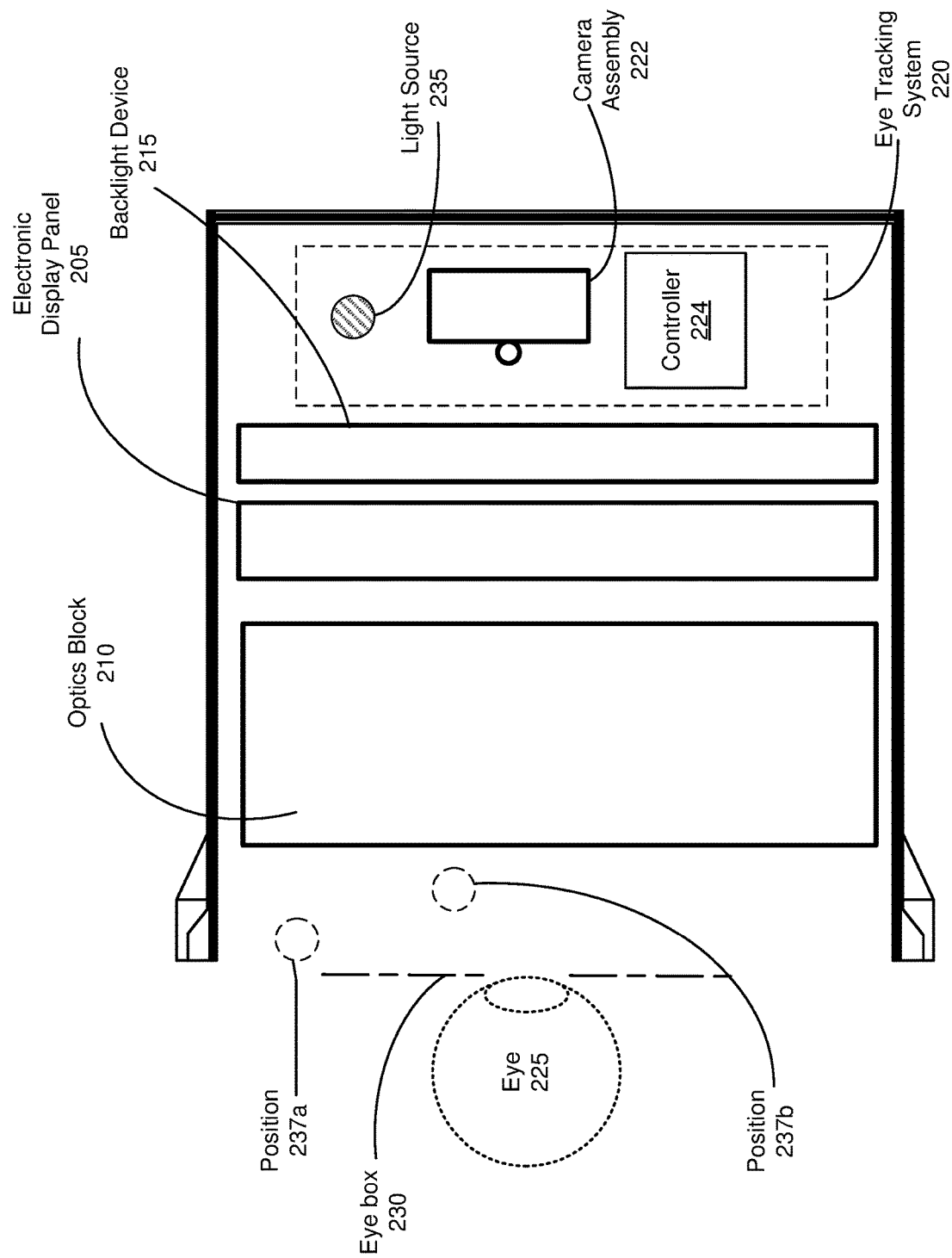
FIG. 2 is a cross-section of a front rigid body of the HMD in FIG. 1, in accordance with one embodiment.

FIG. 2 is a cross-section of a front rigid body of the HMD 100 in FIG. 1, in accordance with one embodiment. The cross-section 200 includes a backlight device 215, an electronic display panel 205, an optics block 210, and an eye tracking system 220. Although FIG. 2 depicts a center cross-section of an eye 225, the center cross-section of the eye 225 and backlight device 215 do not have to be in the same place. An additional electronic display panel 205 and optics block 210, separate from those shown in FIG. 2, may be included in the front rigid body 105 to present content to another eye of the user.

The backlight device 215 generates light that is provided to the electronic display panel 205. The backlight device 215 includes an illumination source that generates light in a first optical band. The backlight device 215 is configured to redirect light within the first optical band (e.g., ambient light as well as light from the illumination source) toward to the electronic display panel 205. The backlight device 215 is also substantially transparent to light within a second optical band. In some embodiments, the first optical band represents wavelengths within the visible light range (e.g., 400 to 250 nm) and the second optical band represents wavelengths within the infrared range (e.g., 750 to 2500 nm.) The reflective and transmissive capabilities of the backlight device are due to the backlight device's 215 inclusion of a structured dichroic reflector. The backlight device is further described below in reference to FIG. 3-4.

The electronic display panel 205 modulates light in the first optical band to generate image light (e.g., content). The electronic display panel 205 spatially modulates light in the first optical band received from the backlight device 215. In some embodiments, the electronic display panel 205 includes a color filter array overlaying a liquid crystal array. The color filter array may be, e.g., a Bayer pattern, or some other color pattern. Light in the first optical band from the backlit device 215 is modulated by the color filter array and the liquid crystal array to form the image light. The electronic display panel 205 emits the image light towards the optics block 210.

The optics block 210 magnifies received image light from the electronic display panel 205, corrects optical errors associated with the image light, and presents the corrected image light to a user of the HMD 100. The optics block 210 directs the magnified and/or corrected image light to an eyebox 230 for presentation to a user wearing the HMD 100. The eyebox 230 is a location in space that would be occupied by an eye 225 of a user of the HMD 100.

Magnification of the image light by the optics block 210 allows the electronic display panel 205 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 210 is designed so its effective focal length is larger than the spacing to the electronic display panel 205, which magnifies the image light projected by the electronic display panel 205. Additionally, in some embodiments, the amount of magnification is adjusted by adding or removing optical elements.

In some embodiments, the optics block 210 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display panel 205 for display is pre-distorted, and the optics block 210 corrects the distortion when it receives image light from the electronic display panel 205 generated based on the content.

The eye tracking system 220 tracks a position of the eye 225. The eye tracking system 220 comprises one or more light sources, a camera assembly 222, and a controller 224. Although only one eye 225 of the user is shown in FIG. 2, in some embodiments, the eye tracking system 220 may include at least one light source and at least one camera assembly 222 for each eye of the user. In some embodiments, separate eye tracking systems may be implemented for each eye of the user.

The one or more light sources emit light in a second optical band towards the eyebox 230. In some embodiments, the one or more light sources are implemented to illuminate the eye 225 such that glints off a cornea of the eye 225 may be captured by the camera assembly 222. In some embodiments, the one or more lights sources emit structured light. In some embodiments, one or more lights sources emit pulses of light that are used to determine depth via time of flight. A light source may be, e.g., light emitting diodes (LEDs), organic LEDs, microLEDs, some other light source that emits light in the second optical band, or some combination thereof.

FIG. 2 illustrates a light sources 235, however, in other embodiments the one or more light sources may include additional light sources. Additionally, in other embodiments one or more of the lights sources may be positioned differently. In FIG. 2, the light source 235 is positioned behind the backlight device 215 and emits light in a second optical band through the backlit device 215, the electronic display panel 250, and the optics block 210 towards the eyebox 230. In other embodiments, some or all of the one or more light sources are positioned elsewhere. For example, a light source may located at a position 237a that is located along a periphery of the optics block 210. At position 237a the light source would generally be outside of a field of view of the eye 225. In another embodiment, a light source could be at a position 237b such that the light source is located in a field of view of the user. For example, the light source could be, e.g., a micoLED that is affixed to a surface of the optics block 210. While there are two alternate positions 237a, 237b illustrated, the one or more light sources may be located elsewhere in the front rigid body.

The camera assembly 222 captures images of the eye 225 through the backlight device 215, the electronic display panel 205, and the optics block 210 using one or more cameras. A camera may be, e.g., an array (1D or 2D) of photodiodes, a charge coupled display (CCD) array, some other device capable of detecting light in the second optical band, or some combination thereof. The camera assembly 222 captures images in accordance with instructions received from the controller 224.

The controller 224 controls components of the eye tracking system 220. The controller 224 generates tracking instructions for the one or more light sources (e.g., 235a-c) and the camera assembly 222. In some embodiments, the controller 224 receives one or more images of the user's eye 225 captured by the camera assembly 222. The controller 224 determines eye tracking information using images from the camera assembly 222. For example, in some embodiments, the controller 224 identifies locations of reflections of light from the one or more light sources (e.g., 235a, 235b, and/or 235c) in an image of the eye 225. The controller 224 determines a position and an orientation of the eye 225 based on the shape and/or locations of the identified reflections. In cases where the target region is illuminated with a structured light pattern, the controller 224 can detect distortions of the structured light pattern projected onto the eye 225, and can estimate a position and an orientation of the eye 225 based on the detected distortions. The controller 224 can also estimate a pupillary axis, a gaze angle (e.g., corresponds to a foveal axis), a translation of the eye, a torsion of the eye, and a current shape of the eye 225 based on one or more images captured by the camera assembly 222.

In some embodiments, the front rigid body further comprises a varifocal module (not shown in FIG. 2). The varifocal module may adjust focus of one or more images displayed on the electronic display panel 205, based on the eye tracking information. In one embodiment, the varifocal module adjusts focus of the displayed images and mitigates vergence-accommodation conflict by adjusting a focal distance of the optics block 210 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 224 to generate content for presentation on the electronic display panel 205.

Figure 3:
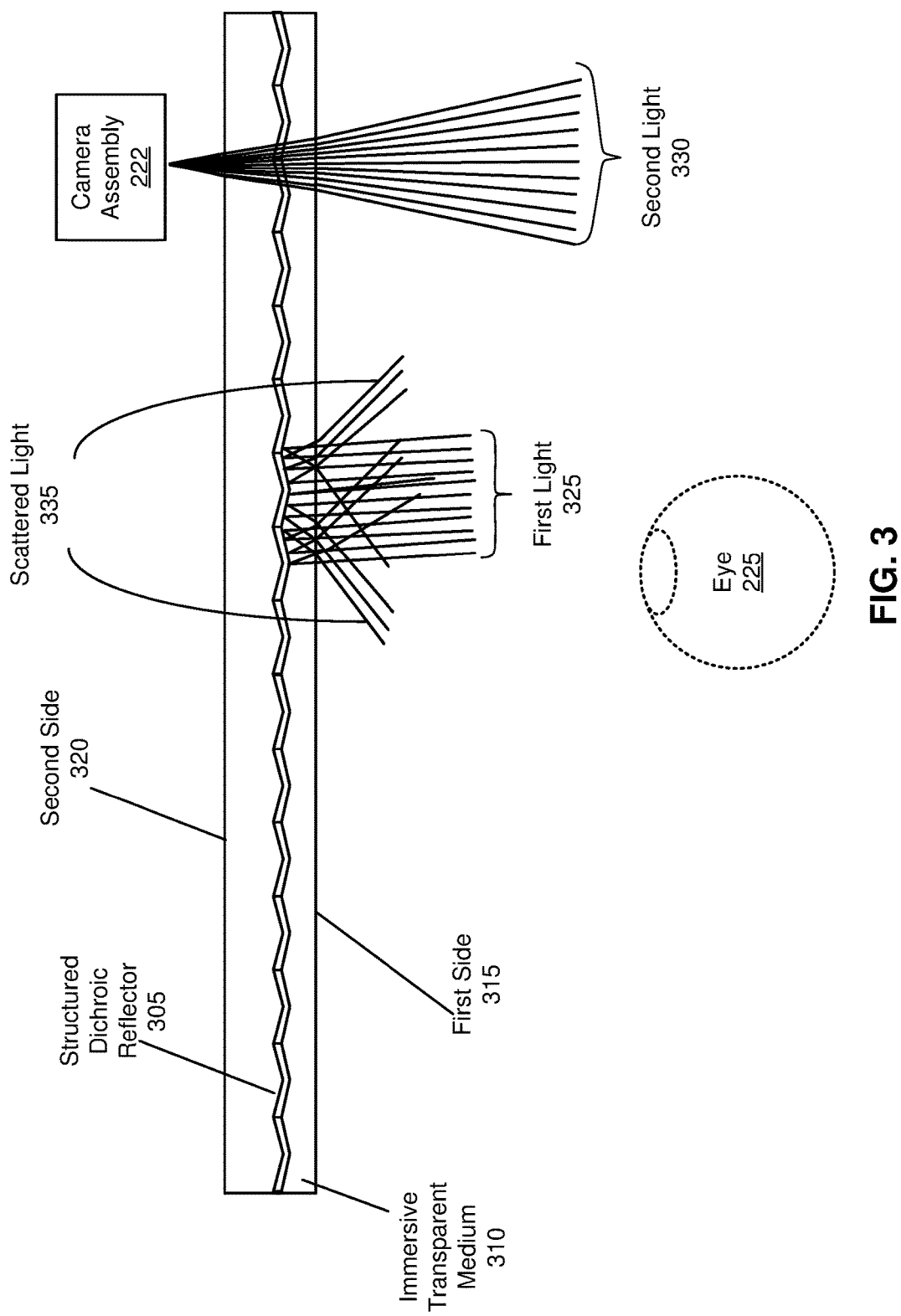
FIG. 3 is a diagram of a backlight device that scatters one range of wavelengths and transmits another, in accordance with one embodiment.

FIG. 3 is a diagram of a backlight device 300 that scatters one range of wavelengths and transmits another, in accordance with one embodiment. The backlight device 300 comprises a structured dichroic reflector 305 immersed in an immersive transparent medium 310.

The structured dichroic reflector 305 is configured to scatter light in the first optical band and be substantially transparent to light in the second optical band. Physically, in some embodiments, the structured dichroic reflector 305 may have a thickness no greater than 10% of the length of the structured dichroic reflector 305, the thickness being defined by a first side 315 and a second side 320. The first side 315 is closer to the eye 225 than the camera assembly 222, and the second side 320 is closer to the camera assembly 222 than the eye 225. The first side 315 may be flat with a maximum roughness of 10 microns and an average slope of the roughness of no more than 5°. In some embodiments, the first side 315 may have a roughness greater than 10 microns and an average slope greater than 5° if optically coupled with an additional flat and smooth layer. The second side 320 may have a structure with features containing peaks adjacent to valleys in both the length and width directions, where the average distance between peaks and valleys is approximately between 1 and 5,000 microns, with the most ideal range between 5 and 100 microns. Additionally, less than 10% of the structured surface has a slope exceeding 45°, but more optimally less than 10% of the structured surface has a slope of less than 20°.

A first light 325 represents light with wavelengths within the first optical band and a second light 330 represents light with wavelengths within the second optical band. The first light 325 incident on a structured dichroic reflector 305 is reflected to form a scattered light 335 at various angles of reflection. In some embodiments, the backlight device 300 has at least 80% reflectivity for the first optical band. In one embodiment, the first light 325 is collimated and incident to the first side 315 of the immersive transparent medium 310 at substantially 0 degrees (i.e., normal to the surface). In this embodiment, the first light 325 is scattered by the structured dichroic reflector 305 such that the scattered light 335 scatters at an average angle that includes 20° to 35° (relative to a normal of the front side 315).

The scattered light 335 is redirected towards the electronic display panel 205 to be converted into imaging light in the second optical band. An example geometry of the scattering process is further described below in reference to FIG. 4. In contrast, the second light 330 is at least partially transmitted by the structured dichroic reflector 305 to form a clear image of an object that is viewed by the camera assembly 222 through a structured dichroic reflector 305. In some embodiments, the backlight device 300 has at least 60% transmission for the second optical band.

The immersive transparent medium 310 is an optical media that is substantially transparent to light in the first optical band and light in the second optical band. The optical media may be composed of glass, plastic, or some other material that is substantially transparent to light in the first optical band and light in the second optical band, or some combination thereof. Suitable plastics include, e.g., polycarbonate, polymethylmethacrylate, poly dimethyl siloxane (PDMS), polystyrene, polyacrylates, and other optically clear polymers. The transparent optical media has—a first side 315 and a second side 320 that is opposite the first side 315. As illustrated the first side 315 and the second side 320 are substantially flat. In other embodiments, one or both surfaces may be curved to impart optical power to the first light 325 and the second light 330. In one embodiment, the immersive transparent medium 310 neither substantially distorts nor degrades an image of an objects placed about 4 centimeters from structured dichroic reflector 305.

The camera assembly 222 is configured to generate an image in the second optical band through the backlight device. In some embodiments, images generated by the camera assembly 222 have optical transfer functions of at least 1 line pair/mm. An optical transfer function describes how different spatial frequencies are resolved by the camera assembly 222 using light reflected from the eye 225, and in this case transmitted through a variety of components (e.g., the immersive transparent medium 310 and the structured dichroic reflector 305). In some embodiments, the resolution of these images is measured using a camera lens adjacent to the second side 320 with a resolution target 4 cm from the first side 315. The controller 340 controls the eye tracking component of the HMD.

Figure 4:
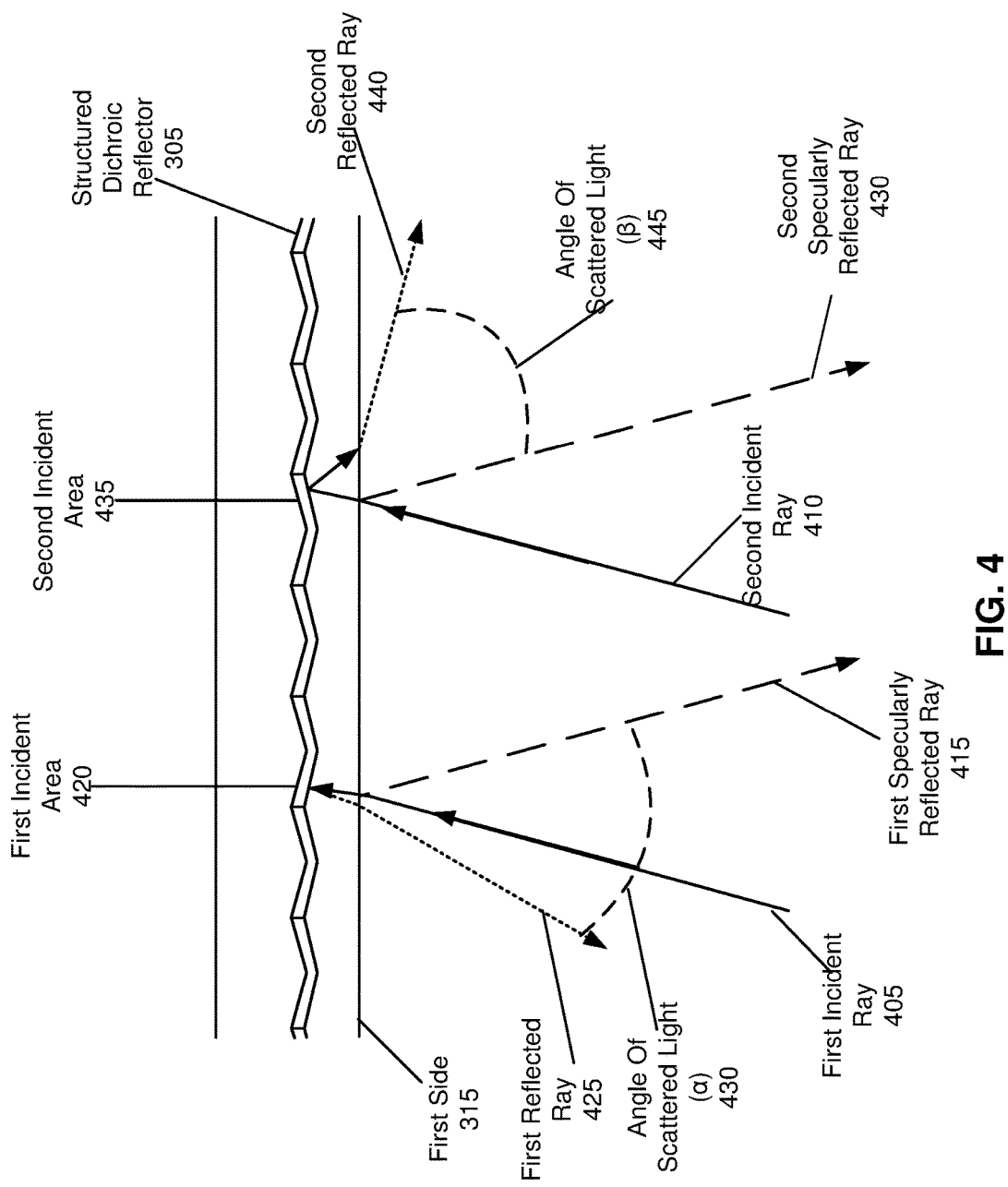
FIG. 4 is a diagram of light in a first optical band scattering off of a portion of the backlight device in accordance with one embodiment.

FIG. 4 is a diagram of light in a first optical band scattering off of a portion of the backlit device 300, in accordance with one embodiments. As discussed earlier, light in the first optical band is reflected off the backlight device 300 towards the electronic display panel 205 and directed towards the optics block 210. First incident ray 405 and second incident ray 410 are incident to the structured dichroic reflector 305. Because both incident rays 405 and 410 are within the first optical band, they fractionally reflect off the structured dichroic reflector 305. More specifically, a fraction of first incident ray 405 is specularly reflected towards the electronic display panel 205 after striking the first side 315 of the reflector, forming first specularly reflected ray 415. However, the remainder of first incident ray 405 is transmitted through the front side 315 and reflects off of the first incident area 420 to form first reflected ray 425. Between first specularly reflected ray 415 and first reflected ray 425, the angle of scattered light (α) 430 is formed. In one embodiment, the angle of scattered light (α) is between 10° and 80°, but most optimally between 30° and 50°.

The behavior of first incident ray 405 embodies a situation in which the first specularly reflected ray 415 and the first reflected ray 425 occur on opposite sides of the incident ray (e.g. left side or right side). In some embodiments, diagrammed in reference to second incident ray 410, the reflected rays may occur on the same side of the incident ray. Similar to first incident ray 405, a fraction of the incident ray is specularly reflected to form second specularly reflected ray 430. Upon transmission to the structured dichroic reflector 305, the remaining fraction strikes the second incident area 435 to form the second reflected ray 440. As described in reference to the first incident ray 405, in some embodiments, the angle of scattered light (β) is between 10° and 80°, but most optimally between 30° and 50°.

HMD System

Figure 5:
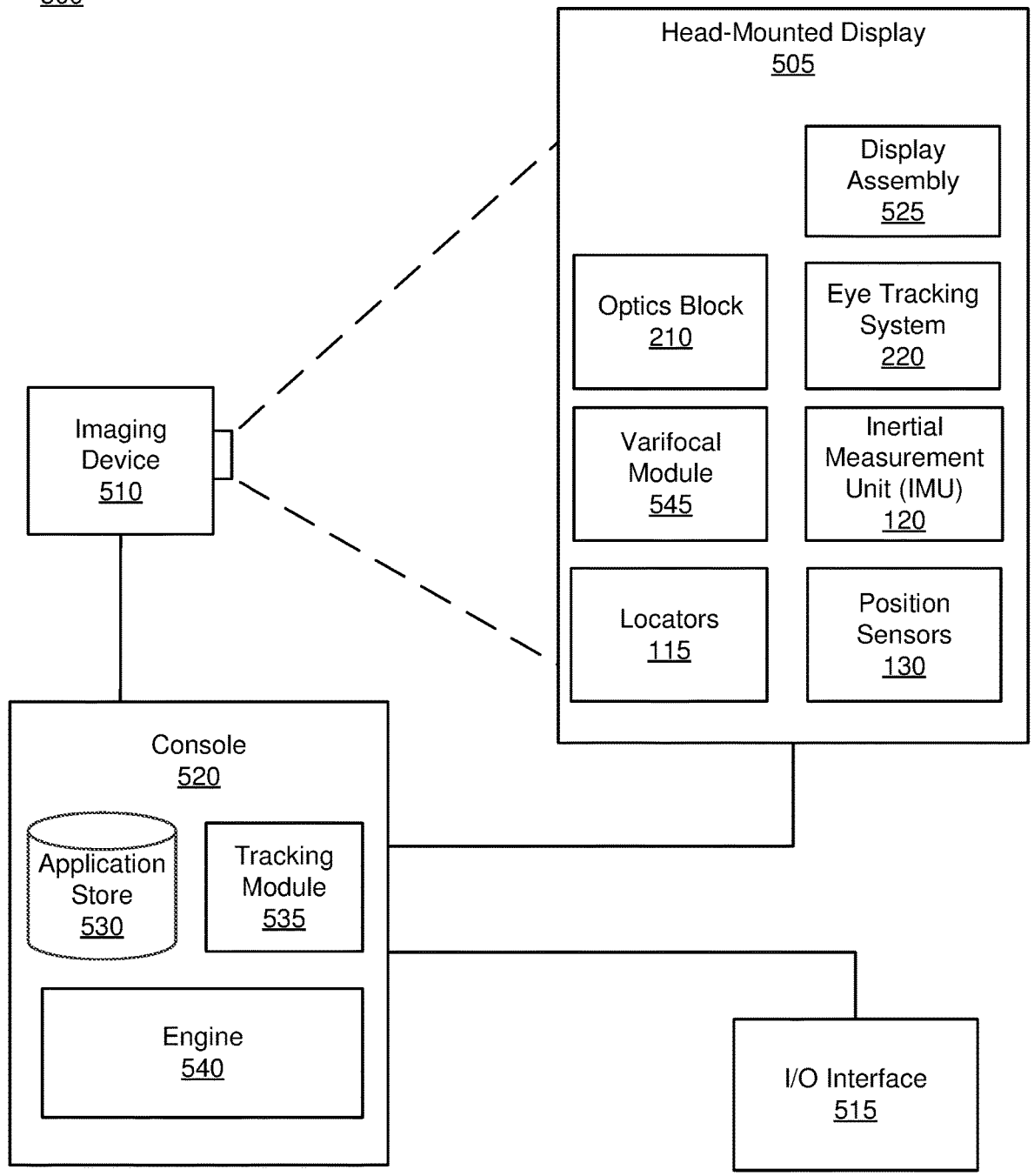
FIG. 5 is a block diagram of an HMD system environment including a backlight device, in accordance with one assembly.

FIG. 5 is a HMD system 500 in accordance with one embodiment. The system 500 may be used as an artificial reality system. The system 500 includes an HMD 505, an imaging device 510, and an input/output (I/O) interface 515, which are each coupled to a console 520. While FIG. 5 shows a single HMD 505, a single imaging device 510, and a single I/O interface 515, in other embodiments, any number of these components may be included in the HMD system 500. For example, there may be multiple HMDs 500, each having an associated I/O interface 515 and being monitored by one or more imaging devices 510, with each HMD 505, I/O interface 515, and imaging devices 510 communicating with the console 520. In other embodiments, different and/or additional components may also be included in the system 500.

The HMD 505 may act as an artificial reality HMD. In some embodiments, the HMD 505 augments views of a physical, real-world environment with computer-generated elements (e.g., images, video, sound, etc.). The HMD 505 presents content to a user. In some embodiments, the HMD 100 is an embodiment of the HMD 505. Example content includes images, video, audio, or some combination thereof. Audio content may be presented via a separate device (e.g., speakers and/or headphones) external to the HMD 505 that receives audio information from the HMD 505, the console 520, or both. The HMD 505 includes one or more locators 115, the inertial measurement unit (IMU) 120, the position sensors 130, a display assembly 525 the optics block 210, and a varifocal module 545.

The locators 115 are objects located in specific positions on the HMD 505 relative to one another and relative to a specific reference point on the HMD 505. A locator 115 may be a light emitting diode (LED), a corner cube reflector, a reflective marker, a type of light source that contrasts with an environment in which the HMD 505 operates, or some combination thereof. Active locators 115 (i.e., an LED or other type of light emitting device) may emit light in the visible band (~380 nm to 750 nm), in the infrared (IR) band (~440 nm to 1700 nm), in the ultraviolet band (10 nm to 380 nm), some other portion of the electromagnetic spectrum, or some combination thereof.

The locators 115 can be located beneath an outer surface of the HMD 505, which is transparent to the wavelengths of light emitted or reflected by the locators 115 or is thin enough not to substantially attenuate the wavelengths of light emitted or reflected by the locators 115. Further, the outer surface or other portions of the HMD 505 can be opaque in the visible band of wavelengths of light. Thus, the locators 115 may emit light in the IR band while under an outer surface of the HMD 505 that is transparent in the IR band but opaque in the visible band.

As described above with reference to FIG. 1, the IMU 120 is an electronic device that generates IMU data based on measurement signals received from one or more of the position sensors 130, which generate one or more measurement signals in response to motion of HMD 505. Examples of the position sensors 130 include accelerometers, gyroscopes, magnetometers, other sensors suitable for detecting motion, correcting error associated with the IMU 120, or some combination thereof.

Based on the measurement signals from the position sensors 130, the IMU 120 generates IMU data indicating an estimated position of the HMD 505 relative to an initial position of the HMD 505. For example, the position sensors 130 include multiple accelerometers to measure translational motion (forward/back, up/down, left/right) and multiple gyroscopes to measure rotational motion (e.g., pitch, yaw, and roll). The IMU 120 can, for example, rapidly sample the measurement signals and calculate the estimated position of the HMD 505 from the sampled data. For example, the IMU 120 integrates measurement signals received from the accelerometers over time to estimate a velocity vector and integrates the velocity vector over time to determine an estimated position of a reference point on the HMD 505. The reference point is a point that may be used to describe the position of the HMD 505. While the reference point may generally be defined as a point in space, in various embodiments, a reference point is defined as a point within the HMD 505 (e.g., a center of the IMU 120). Alternatively, the IMU 120 provides the sampled measurement signals to the console 520, which determines the IMU data.

The IMU 120 can additionally receive one or more calibration parameters from the console 520. As further discussed below, the one or more calibration parameters are used to maintain tracking of the HMD 505. Based on a received calibration parameter, the IMU 120 may adjust one or more of the IMU parameters (e.g., sample rate). In some embodiments, certain calibration parameters cause the IMU 120 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The display assembly 525 displays images to the user in accordance with data received from the console 520. In various embodiments, the display assembly 525 comprises one or more backlight devices (e.g., the backlight device 215) and one or more corresponding electronic display panels (e.g., the electronic display panels 205). For example, in some embodiments, there is a backlight device and corresponding electronic display panel for each eye.

The backlight device is configured to receive light in a first optical band from an illumination source, and the backlight device includes a structured dichroic reflector, immersed in transparent optical media, that is substantially reflective in the first optical band and is substantially transparent in a second optical band that is different than the first optical band. The structured dichroic reflector is configured to reflect light in first optical band through the second surface toward an electronic display panel which converts the light from the backlight device to image light. The electronic display panel manipulates and directs emitted light from the backlight reflector to display media generated by the HMD 505. In particular, the electronic display panel spatially modulates white imaging light using a color filter array and a liquid crystal spatial light modulator.

The optics block 210 magnifies image light received from the display assembly 525, corrects optical errors associated with the image light, and presents the corrected image light to a user of the HMD 505. The optics block 210 includes a plurality of optical elements. Example optical elements included in the optics block 210 include: an aperture, a Fresnel lens, a convex lens, a concave lens, a filter, a reflecting surface, a feature waveguide, or any other suitable optical element that affects image light. Moreover, the optics block 210 may include combinations of different optical elements. In some embodiments, one or more of the optical elements in the optics block 210 may have one or more coatings, such as partially reflective or anti-reflective coatings.

The eye tracking system 220 determines eye tracking information associated with an eye of a user wearing the HMD 505. The eye tracking information determined by the eye tracking system 220 may comprise information about an orientation of the user's eye, i.e., information about an angle of an eye-gaze. The eye tracking system 220 is discussed above in detail with regard to FIG. 2.

In some embodiments, the varifocal module 545 is further integrated into the HMD 505. The varifocal module 545 may be coupled to the eye tracking system 220 to obtain eye tracking information determined by the eye tracking system 220. The varifocal module 545 may be configured to adjust focus of one or more images displayed on the electronic display panel 205, based on the determined eye tracking information obtained from the eye tracking system 220. In this way, the varifocal module 545 can mitigate vergence-accommodation conflict in relation to image light. The varifocal module 545 can be interfaced (e.g., either mechanically or electrically) with at least one of the electronic display panel 205 and at least one optical element of the optics block 210. Then, the varifocal module 545 may be configured to adjust focus of the one or more images displayed on the electronic display panel 205 by adjusting position of at least one of the electronic display panel 205 and the at least one optical element of the optics block 210, based on the determined eye tracking information obtained from the eye tracking system 220. By adjusting the position, the varifocal module 545 varies focus of image light output from the electronic display panel 205 towards the user's eye. The varifocal module 545 may be also configured to adjust resolution of the images displayed on the electronic display panel 205 by performing foveated rendering of the displayed images, based at least in part on the determined eye tracking information obtained from the eye tracking system 220. In this case, the varifocal module 545 provides appropriate image signals to the electronic display panel 205. The varifocal module 545 provides image signals with a maximum pixel density for the electronic display panel 205 only in a foveal region of the user's eye-gaze, while providing image signals with lower pixel densities in other regions of the electronic display panel 205.

The I/O interface 515 is a device that allows a user to send action requests to the console 520. An action request is a request to perform a particular action. For example, an action request may be to start or end an application or to perform a particular action within the application. The I/O interface 515 may include one or more input devices. Example input devices include a keyboard, a mouse, a game controller, or any other suitable device for receiving action requests and communicating the received action requests to the console 520. An action request received by the I/O interface 515 is communicated to the console 520, which performs an action corresponding to the action request. In some embodiments, the I/O interface 515 may provide haptic feedback to the user in accordance with instructions received from the console 520. For example, haptic feedback is provided by the I/O interface 515 when an action request is received, or the console 520 communicates instructions to the I/O interface 515 causing the I/O interface 515 to generate haptic feedback when the console 520 performs an action.

The console 520 provides content to the HMD 505 for presentation to the user in accordance with information received from the imaging device 510, the HMD 505, or the I/O interface 515. In the example shown in FIG. 5, the console 520 includes an application store 530, a tracking module 535, and an engine 540. Some embodiments of the console 520 have different or additional modules than those described in conjunction with FIG. 5. Similarly, the functions further described below may be distributed among components of the console 520 in a different manner than is described here.

The application store 530 stores one or more applications for execution by the console 520. An application is a group of instructions, that when executed by a processor, generates content for presentation to the user. Content generated by an application may be in response to inputs received from the user via movement of the HMD 505 or the I/O interface 515. Examples of applications include gaming applications, conferencing applications, video playback application, or other suitable applications.

The tracking module 535 calibrates the system 500 using one or more calibration parameters and may adjust one or more calibration parameters to reduce error in determining position of the HMD 505. For example, the tracking module 535 adjusts the focus of the imaging device 510 to obtain a more accurate position for observed locators 115 on the HMD 505. Moreover, calibration performed by the tracking module 535 also accounts for information received from the IMU 120. Additionally, if tracking of the HMD 505 is lost (e.g., imaging device 510 loses line of sight of at least a threshold number of locators 115), the tracking module 535 re-calibrates some or all of the system 500 components.

Additionally, the tracking module 535 tracks the movement of the HMD 505 using imaging information from the imaging device 510 and determines positions of a reference point on the HMD 505 using observed locators from the imaging information and a model of the HMD 505. The tracking module 535 also determines positions of the reference point on the HMD 505 using position information from the IMU information from the IMU 120 on the HMD 505. Additionally, the tracking module 535 may use portions of the IMU information, the imaging information, or some combination thereof, to predict a future location of the HMD 505, which is provided to the engine 540.

The engine 540 executes applications within the system 500 and receives position information, acceleration information, velocity information, predicted future positions, or some combination thereof for the HMD 505 from the tracking module 535. Based on the received information, the engine 540 determines content to provide to the HMD 505 for presentation to the user, such as a virtual scene, one or more virtual objects to overlay onto a real world scene, etc. Additionally, the engine 540 performs an action within an application executing on the console 520 in response to an action request received from the I/O interface 515 and provides feedback to the user that the action was performed. The provided feedback may be visual or audible feedback via the HMD 505 or haptic feedback via I/O interface 515.

In some embodiments, the engine 540 estimates one or more future positions of the HMD 505 using the IMU data from the HMD 505. The engine 540 generates warping parameters based on the one or more estimated future positions, and provides the warping parameters to the HMD 505 with the content.

In some embodiments, based on the eye tracking information (e.g., orientation of the user's eye) received from the eye tracking system 525, the engine 540 determines resolution of the content provided to the HMD 505 for presentation to the user on the display assembly 525. The engine 540 provides the content to the HMD 505 having a maximum pixel resolution on the display assembly 525 in a foveal region of the user's gaze, whereas the engine 540 provides a lower pixel resolution in other regions of the display assembly 525, thus achieving less power consumption at the HMD 505 and saving computing cycles of the console 520 without compromising a visual experience of the user. In some embodiments, the engine 540 can further use the eye tracking information to adjust where objects are displayed on the display assembly 525 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD) comprising:
    a backlight device that includes a first surface and a second surface that is opposite to the first surface, the backlight device configured to receive light in a first optical band from an illumination source, the backlight device including a structured dichroic reflector that is substantially reflective in the first optical band and is substantially transparent in a second optical band that is different than the first optical band, and the structured dichroic reflector is configured to reflect light in the first optical band through the second surface toward a display panel that converts the reflected light from the backlighting device into image light;
    an optics block including one or more optical elements configured to direct the image light to an eyebox, the eyebox being a region in space that is occupied by an eye of a user of the HMD;
    an eye tracking system comprising:
        a light source that illuminates the eyebox with light in the second optical band,
        a camera assembly positioned adjacent to the first surface of the backlighting device, and the camera assembly is configured to capture images of the eye in the second optical band through the backlighting device, the display panel, and the optics block; and
    a controller configured to determine eye tracking information based at least in part on the captured images.

2. The HMD of claim 1, wherein the light source is adjacent to the first surface of the backlight device and emits light though the backlight device toward the eyebox.

3. The HMD of claim 2, wherein the light source is within a threshold distance from an optical axis of the HMD.

4. The HMD of claim 1, wherein the light source directly illuminates the eyebox.

5. The HMD of claim 1, wherein an image captured by the camera assembly through the backlight device has a spatial resolution of at least 1 line pair/mm.

6. The HMD of claim 1, wherein the second optical band is a band of infrared light and the first optical band is a band of visible light.

7. The HMD of claim 1, wherein an average angle between light rays, in the first optical band of light incident to the second surface of the backlight device and light rays exiting the second surface after reflection by the structured dichroic reflector is between 10° and 80°.

8. The HMD of claim 1, wherein an average angle between light rays, in the first optical band of light incident to the second surface of the backlight device and light rays exiting the second surface after reflection by the structured dichroic reflector is between 30° and 50°.

9. The HMD of claim 1, wherein an angle between a light ray in the first optical band of light at normal incidence to the second surface of the backlight device and a light ray exiting the second surface after it has been reflected by the structured dichroic reflector is at least 20°.

10. The HMD of claim 1, wherein the structured dichroic reflector of the backlight device has a maximum angle of 45° relative to the second surface.

11. A method comprising:
    receiving, at a first surface of a backlight device, light in a first optical band from an illumination source, the backlight device including a second surface that is opposite to the first surface and a structured dichroic reflector that is substantially reflective in the first optical band and is substantially transparent in a second optical band that is different than the first optical band;
    reflecting, at the structured dichroic reflector, light in the first optical band through the second surface towards a display panel;
    converting, at the display panel, the reflected light from the backlighting device into image light;
    directing, by an optics block, the image light towards an eyebox, the eyebox being a region in space that is occupied by an eye of a user;
    capturing, by a camera assembly positioned adjacent to the first surface of the backlighting device, images of the eye in the second optical band through the backlighting device, the display panel, and the optics block; and
    determining eye tracking information based at least in part on the captured images.

* * * * *